US009883147B1

(12) United States Patent
Zaluski

(10) Patent No.: US 9,883,147 B1
(45) Date of Patent: Jan. 30, 2018

(54) VERTICAL MAST POSITIONER FOR MOBILE SURVEILLANCE APPLICATIONS

(71) Applicant: Jason P Zaluski, Ruther Glen, VA (US)

(72) Inventor: Jason P Zaluski, Ruther Glen, VA (US)

(*) Notice: Subject to any disclaimer, the term of this patent is extended or adjusted under 35 U.S.C. 154(b) by 0 days.

(21) Appl. No.: 15/482,491

(22) Filed: Apr. 7, 2017

Related U.S. Application Data

(60) Provisional application No. 62/410,267, filed on Oct. 19, 2016.

(51) Int. Cl.
| *E04H 12/22* | (2006.01) |
| *E04H 12/34* | (2006.01) |
| *H01Q 1/12* | (2006.01) |
| *H04N 7/18* | (2006.01) |
| *G01C 15/00* | (2006.01) |
| *H01Q 1/18* | (2006.01) |

(52) U.S. Cl.
CPC ............ *H04N 7/181* (2013.01); *G01C 15/00* (2013.01); *H01Q 1/1235* (2013.01); *H01Q 1/18* (2013.01); *H04N 7/185* (2013.01); *E04H 12/2284* (2013.01); *E04H 12/345* (2013.01)

(58) Field of Classification Search
CPC . E04H 12/182; E04H 12/345; E04H 12/2284; E04H 12/18; E04H 12/20
See application file for complete search history.

(56) References Cited

U.S. PATENT DOCUMENTS

| 2,676,677 | A | * | 4/1954 | Anderson | ............. E04H 12/182 182/101 |
| 3,468,398 | A | * | 9/1969 | Galloway | ................. B66F 3/28 182/141 |
| 5,002,252 | A | * | 3/1991 | Setala | .................... A47G 33/12 248/523 |
| 7,574,832 | B1 | * | 8/2009 | Lieberman | .............. E04H 12/10 212/350 |
| 7,997,388 | B2 | * | 8/2011 | Nieboer | ............... H01Q 1/1242 187/222 |
| 8,365,471 | B2 | * | 2/2013 | Diniz | ........................ E04H 9/16 340/601 |
| 8,522,511 | B2 | * | 9/2013 | Thoren | ................. E04H 12/182 52/118 |
| 8,534,004 | B2 | * | 9/2013 | Wasson | ................. E04H 12/182 52/114 |
| 9,309,686 | B2 | * | 4/2016 | Gorney | ................. E04H 12/182 |
| 2003/0161622 | A1 | * | 8/2003 | Zantos | ................. E04H 12/182 396/419 |
| 2004/0208499 | A1 | * | 10/2004 | Grober | .................... B63B 22/24 396/428 |

(Continued)

*Primary Examiner* — Rodney Mintz
(74) *Attorney, Agent, or Firm* — Ming Chow; Sinorica, LLC

(57) ABSTRACT

The present invention is a vertical mast positioner, wherein a telescoping mast can be installed is provided on a frame to be used in mobile surveillance applications. The frame is provided on a mobile platform. The vertical mast positioner is further comprised of at least two actuators which are connected to the frame via support arms and oriented perpendicular to one another. The actuators connect to a collar provided for the mast. The actuators are then extended or retracted to orient the telescoping mast in a perfectly vertical position when the mobile platform encounters an uneven surface.

18 Claims, 4 Drawing Sheets

(56) References Cited

U.S. PATENT DOCUMENTS

| | | | |
|---|---|---|---|
| 2012/0079778 A1* | 4/2012 | Wasson | H01Q 1/1235 52/115 |
| 2012/0151852 A1* | 6/2012 | Thoren | E04H 12/182 52/111 |
| 2012/0151853 A1* | 6/2012 | Thoren | E04H 12/182 52/111 |
| 2015/0042811 A1* | 2/2015 | Avignon | H01Q 1/10 348/152 |
| 2015/0292227 A1* | 10/2015 | Gorney | E04H 12/182 52/114 |
| 2016/0376806 A1* | 12/2016 | Vetesnik | F16M 11/42 52/121 |
| 2017/0122490 A1* | 5/2017 | Verstrate | F16M 11/08 |
| 2017/0167157 A1* | 6/2017 | Gorney | E04H 12/182 |
| 2017/0254106 A1* | 9/2017 | Bruinsma | B60Q 1/24 |

* cited by examiner

VERTICAL MAST POSITIONER FOR MOBILE SURVEILLANCE APPLICATIONS

CROSS-REFERENCE TO RELATED APPLICATION(S)

The present application claims priority to U.S. Provisional Patent Application No. 62/410,267 filed on Oct. 19, 2016, entitled "VERTICAL MAST POSITIONER FOR MOBILE SURVEILLANCE APPLICATIONS" the entire disclosure of which is incorporated by reference herein.

BACKGROUND OF THE INVENTION

1. Field of Invention

The present invention relates to the field of mast positioners, and more specifically to mast positioners that serve to position a mast in a vertical orientation for masts that are installed and deployed from mobile surveillance platforms.

2. Description of Related Art

Generally, compact telescoping masts, adapted to receive camera systems, can be used for mobile surveillance systems. The telescoping masts may be mounted onto mobile platforms, such as the bed of pickup trucks or similar vehicles, to allow the surveillance system (i.e. mast and camera) to be easily transported into areas that the mobile platform can travel. In such a situation, the mast (and in turn camera) may be deployed (raised) without removal of the mast from the mobile platform.

Typically, a mast is rigidly attached to the bed of a pickup truck such that the mast pole is perpendicular to the plane of the bed of the truck. Under such conditions, the mast itself will necessarily be oriented vertically and at an angle exactly 90 degrees (i.e. perpendicular) to the plane of the mobile platform. Accordingly, if the mobile platform is parked on level ground (i.e. 0 degrees) then the mast will be oriented directly vertical in orientation relative to the ground. However, if the mobile platform is oriented on non-level ground then the mast will be oriented perpendicular to the ground plane angle, and therefore will be at a non-vertical angle.

Masts oriented at non-vertical angles can cause serious issues for mobile deployments. For instance, most mobile platforms (i.e. pickup trucks) have non-rigid suspensions systems, which may cause them to lean from side to side. Mast systems oriented at non-vertical angles may cause the vehicle to lean due to the moment created by the length of the mast, supplemented by the weight of the sensor atop the mast. As the mast is raised, these masts with a non-vertical orientation may exert larger moment forces on the mobile platform, increasing the angle of tilt of the platform, and potentially causing the vehicle to tip over.

Furthermore, if a telescoping mast is oriented out of a vertical position, the sections of the telescoping mast may slide unevenly when the mast is extending or retracting. The further the mast is oriented from a vertical angle, the greater the unevenness of the telescoping mast section sliding. This uneven sliding of the telescoping sections can cause the mast to wear quickly and may even cause the mast to bind, thereby preventing the mast from raising and lowering.

Based on the foregoing, there is a need in the art for a means to position mobile masts in a perfectly vertical orientation such that they may be deployed vertically even if the mobile platform is parked on non-level ground.

SUMMARY OF THE INVENTION

The present invention is a vertical mast positioner. In the preferred embodiment, the mast positioner is comprised of a frame to be mounted onto a mobile platform. A telescoping mast is positioned near, or at, the center of the frame. In the preferred embodiment, the telescoping mast base is attached to the frame via a universal joint.

The top of the telescoping mast is provided with a camera system. In an embodiment, the telescoping mast is also fitted with a tilt sensor device, such as an inclinometer, for determining if the mast is level with the ground.

The vertical mast positioner is further comprised of two positioning mounting arms, wherein the bottom end of each positioning mounting arm is rigidly attached to the frame. The top of each positioning mounting arm is provided with a positioning actuator, which attaches to the positioning mounting arm via a swivel joint. The positioning actuators extend from the positioning mounting arms to a collar provided on the telescoping mast. The positioning actuators are attached to the mast collar via a ball joint. The positioning actuators are used to position the mast as necessary to cause the mast to become level. The positioning actuators can be a hydraulic ram, electric screw drive, or pneumatic piston type actuator.

In a preferred embodiment, the two positioning actuators are positioned perpendicular to one another and in alignment with the positioning mounting arms upon which they are mounted. The perpendicular arrangement of the two positioning actuators allows for separate and independent operation of each actuator to push or pull the mast without concern that the other actuator will bind.

In a preferred embodiment, if one positioning actuator is operated (ie. energized) while the other is not, the mast will be pushed or pulled generally in the direction of travel of the operating positioning actuator, and in an arc about the swivel joint where the non-operating positioning actuator is connected to its positioning mounting arm.

In a preferred embodiment, the vertical mast positioner may also consist of one non-positioning mounting arm, wherein the bottom of this non-positioning mounting arm is also rigidly attached to the frame and wherein this non-positioning mounting arm is perpendicular to one of the other two positioning mounting arms. The top of the non-positioning mounting arm is provided with a non-positioning actuator, which attaches to the non-positioning mounting arm via a swivel joint. The non-positioning actuator extends from the non-positioning mounting arm to the collar provided on the telescoping mast. The non-positioning actuator is attached to the mast collar via a ball joint. The non-positioning actuator freely follows the movement of the mast as it is being moved by the positioning actuators but will lock in place once the mast positioning operation has ceased. Once the non-positioning actuator is locked, it provides a third point of structural support for the mast, along with the structural support already provided by the other two positioning actuators. The non-positioning actuator can be a hydraulic ram, pneumatic piston, or similar mechanical configuration to affect the purpose of the non-positioning actuator.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
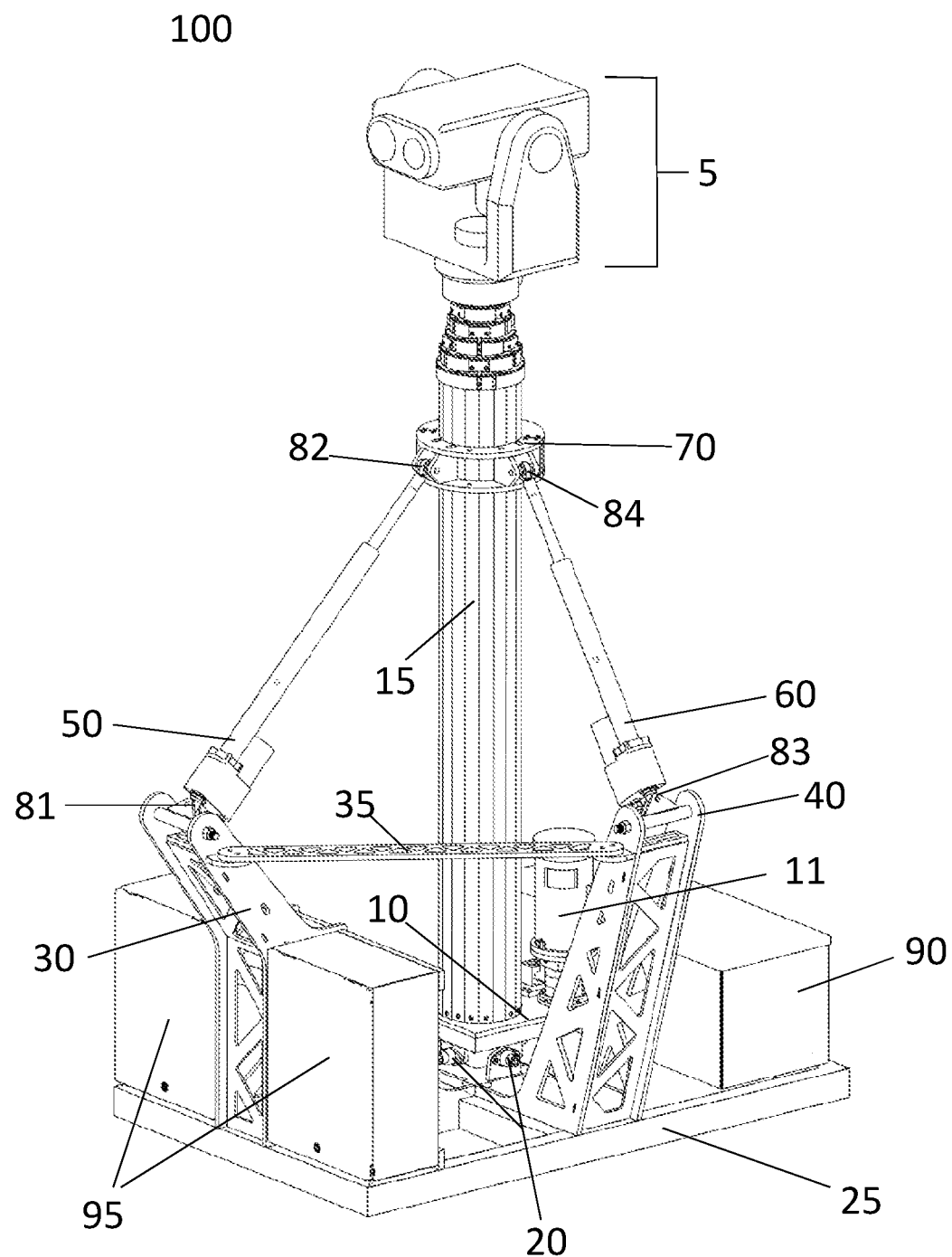
FIG. 1 is a perspective view of the vertical mast positioner, according to an embodiment of the present invention.
Figure 2:
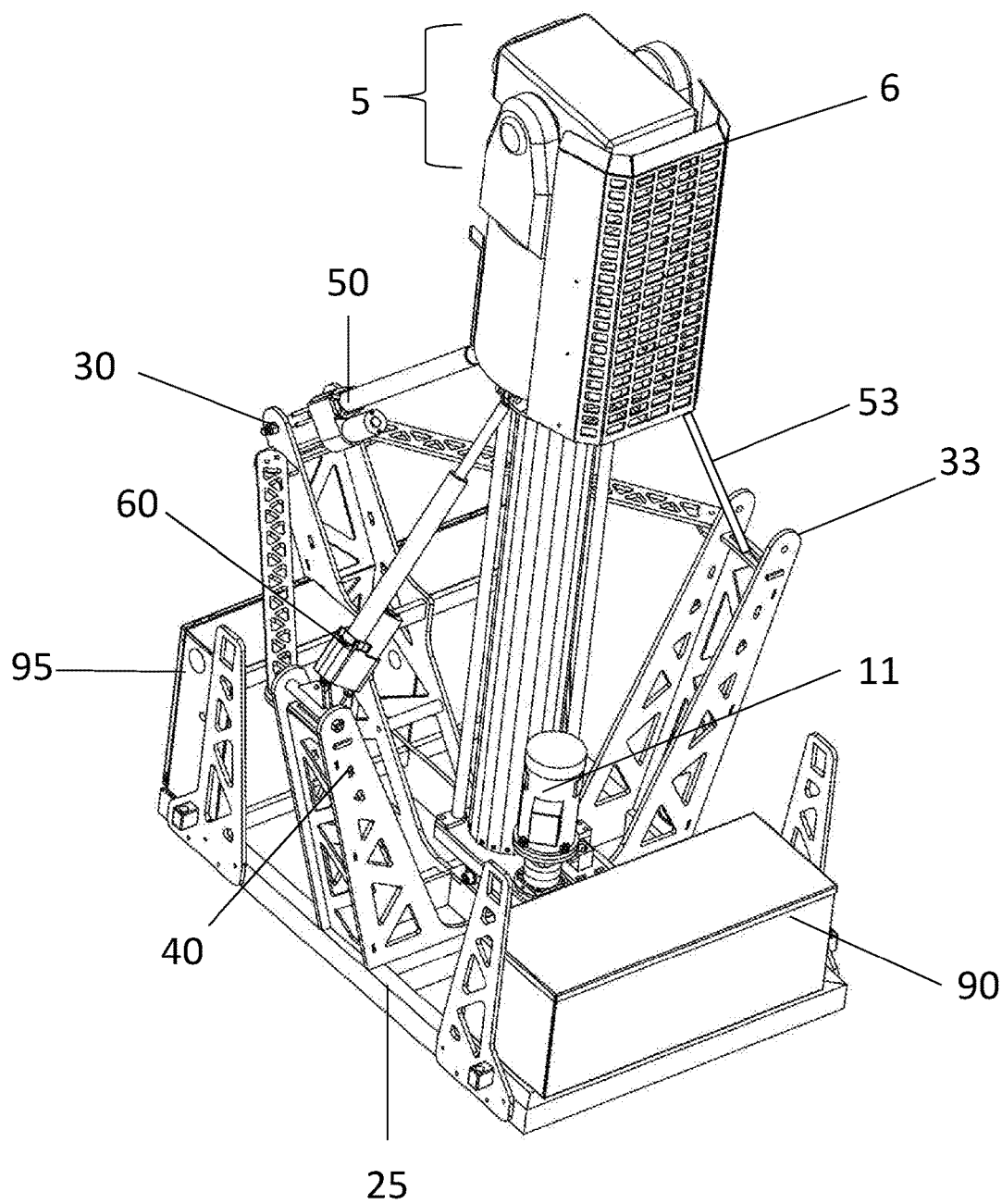
FIG. 2 is a perspective view of the vertical mast positioner, according to an embodiment of the present invention.
Figure 3:
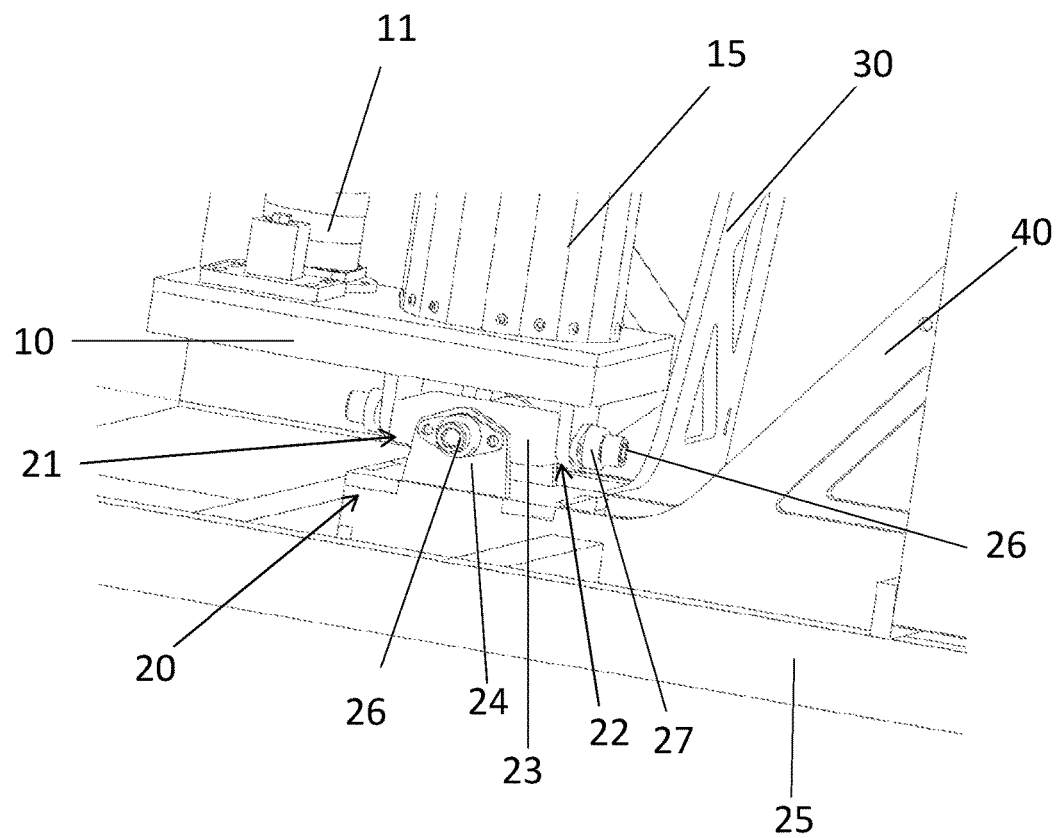
FIGS. 3-4 are detail views of the vertical mast positioner's universal joint, according to an embodiment of the present invention.
Figure 4:
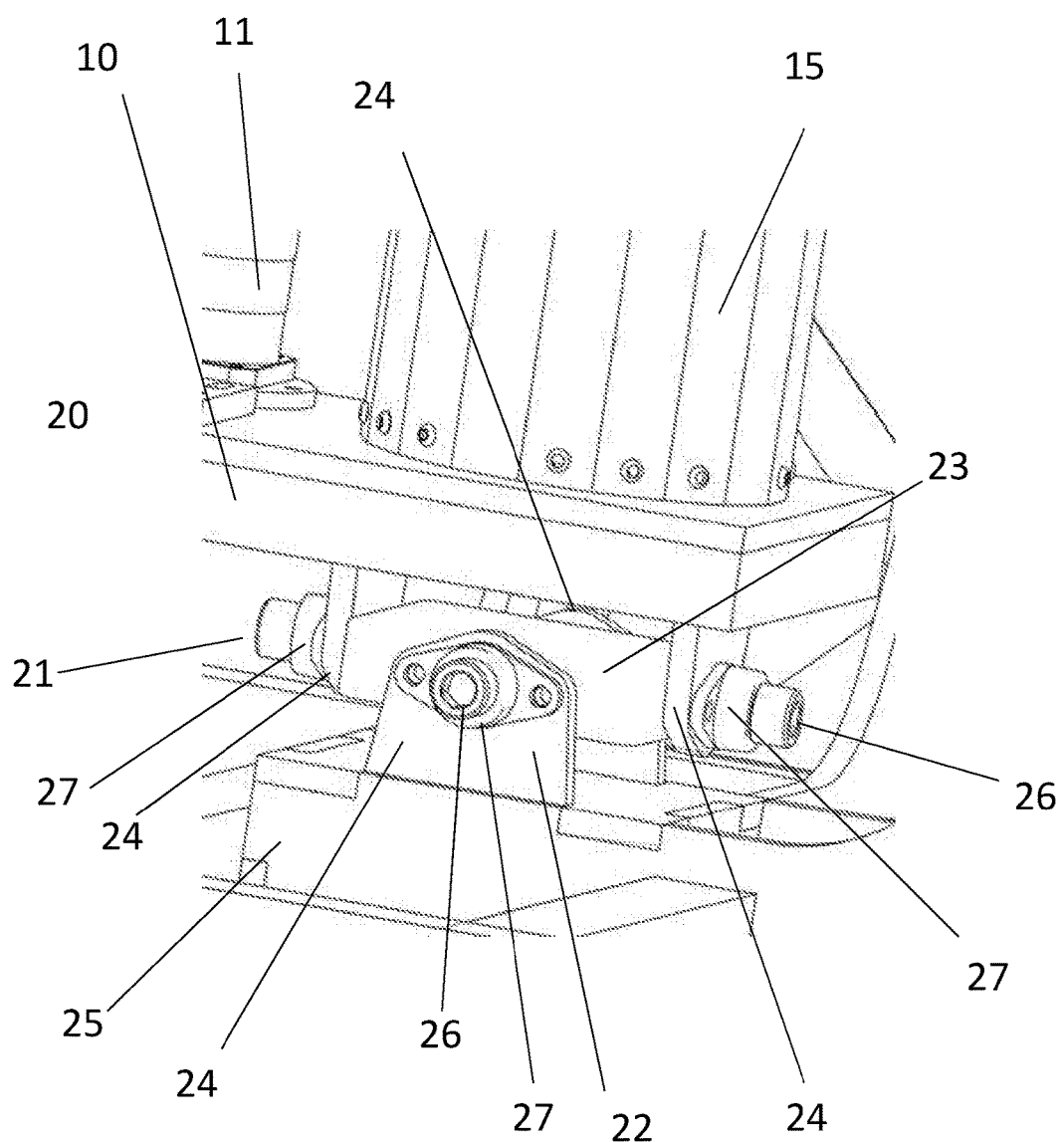

Preferred embodiments of the present invention and their advantages may be understood by referring to FIGS. 1-4, wherein like reference numerals refer to like elements.

In reference to FIGS. 1-4, a vertical mast positioner 100 is shown with a mast 15 fully retracted and in a perfectly vertical orientation. A camera system 5 is mounted to the top of the mast 15. In an embodiment, the camera system is provided with a camera, sensors, and gimbal to capture panoramic images. In an embodiment, the camera system is further provided with a brush guard 6. The brush guard 6, provides protection for sensors and the coiled conduit (not shown) provided to house the wiring of the camera system and sensors. In the preferred embodiment, the brush guard 6 will remain in place as camera system is raised by the telescoping mast. The telescoping motion of the mast will be driven by the mast motor 11.

The bottom of the mast is rigidly attached to a mast base 10. In a preferred embodiment, the mast base 10 is provided with one or more apertures to allow a universal joint 20 to engage into the mast base 10. In said embodiment, the universal joint 20 is comprised of two pivot hinges 21/22 aligned orthogonally, relative to one another, and joined to each other by a cross shaft 23. The top pivot hinge 21 is positioned directly on top of the bottom pivot hinge 22. In the embodiment, the top pivot hinge 21 is joined to the mast base 10 by means of hinge tabs 24 while the bottom pivot hinge 22 is joined to the frame 25 by means of hinge tabs 24. Each pivot hinge is further comprised of an axle bolt 26, which inserts through its respective hinge tab 24. A bearing 27 is provided between the axle bolts 26 and the hinge tabs 24, such that the mast base 10 is free to pivot about each pivot hinge 21/22. This dual pivot hinge configuration of the universal joint 20 enables the mast base 10 and by extension mast 15 the freedom to pivot in all directions. The frame 25, attaches to the mobile platform via bolts or other suitable attachment depending on the configuration of the mobile platform (not shown).

In an embodiment, the vertical mast positioner 100 is further provided with a rear positioning mounting arm 30 and side positioning mounting arm 40 attached to the frame 25. A rear positioning actuator 50 is attached to the rear positioning mounting arm 30 via a swivel joint 81. Additionally, a side positioning actuator 60 is attached to the side positioning mounting arm 40 via swivel joint 83. In an embodiment, the side positioning actuator 60 and rear positioning actuator 50 are attached to a mast collar 70 via ball joints 84 and 82, respectively. In the embodiment, the side positioning actuator 60 and rear positioning actuator 50 are positioned perpendicular to one another.

In an embodiment, the mast collar 70 is fixed to the mast 15. In another embodiment, the mast collar 70 is able to slide about the mast 15 for adjustment purposes. In a preferred embodiment, the side positioning actuator 60 and rear positioning actuator 50 are electrically driven screw drive actuators as known in the art. In another embodiment, the side positioning actuator 60 and rear positioning actuator 50 are of the hydraulic ram type, as is known in the art. In yet another embodiment, the side positioning actuator 60 and rear positioning actuator 50 are of the pneumatic piston type, as is known in the art. In an embodiment, the rear positioning mounting arm 30 and the side positioning mounting arm 40 are further provided with a stabilization plate 35. The ends of the stabilization plate 35 are fastened to the side and rear positioning mounting arms to prevent undesired movement, shaking, or vibration between the two positioning mounting arms. In an embodiment, the stabilization plate 35 may be fastened to the positioning mounting arms via screws, rivets, or another means of fastening deemed suitable by one skilled in the art.

In an alternate embodiment, the vertical mast positioner is provided with a non-positioning mounting arm 33 mounted to the frame 25. This mounting arm can be fitted with a non-positioning or safety actuator (53). In the embodiment, the non-positioning actuator does not provide movement force to position the mast as the rear positioning actuator 50 and side positioning actuator 60 do. Rather the non-positioning actuator (53) provides a locking mechanism when the rear and side positioning actuators are no longer positioning the mast. Wherein the non-positioning actuator is only activated to lock the mast in position, the non-positioning actuator is used as a third point of support for the mast 15, along with the support provided by the rear positioning actuator 50, and side positioning actuator 60. In the embodiment, the non-positioning mounting arm 33 and non-positioning actuator (53) are oriented perpendicular to the rear positioning mounting arm 30 and directly opposite of the side positioning mounting arm 40.

In a preferred embodiment, the vertical mast positioner 100 is further provided with integrated power source, tilt sensors, central processing unit (CPU) and integrated circuitry (IC) to control the side positioning actuator 60 and rear positioning actuator 50 to position the mast in a vertical orientation regardless of the terrain the mobile platform is parked on. In said embodiment, the mast base 10 may be outfitted with one or more tilt sensing components for detecting the orientation of the mast 15 relative to the ground. The data obtained by the tilt sensors is then interpreted in a central processing unit (CPU) with a provided algorithm. The CPU then signals the integrated circuit (IC) to supply the appropriate power, from a provided power source, to engage the appropriate positioning actuator in a direction which will position the mast 15 to a perfectly vertical orientation. Feedback from the tilt sensors will then cause the CPU to signal the IC to stop the positioning actuators when the mast 15 is perfectly level in orientation. When both positioning actuators stop positioning the mast, the CPU with a provided algorithm engages the locking mechanism for the non-positioning actuator so as to provide a third point of support for the mast 15.

In an embodiment, the battery or batteries which power the mast and actuators are contained in a battery enclosure 90. Additionally, the electronic components and sensors of the vertical mast positioner may be contained within the electronic enclosures 95. The enclosures provide protection for the electrical components against the natural elements and weather which may be encountered during use.

In an embodiment, the vertical mast positioner is provided with a manual control system to allow a user to manually control the mast orientation by means of a hand held pendant (not shown) attached to an electronic enclosure on the vertical mast positioner. In an alternate embodiment, wherein a vehicle is provided as the mobile platform, the driver of the mobile platform may be provided with controls on a laptop or other computer contained in the vehicle passenger compartment to allow the operator to control the mast orientation by means of software that is linked to the vertical mast positioner. In another embodiment, the user will be able to set the speed at which the actuators extend and retract to adjust the rate at which the mast is moved to a level orientation upon activation of the leveling operation.

In an embodiment, the vertical mast positioner and its components may be comprised of metal, composite, plastic, or any material deemed appropriate by one skilled in the art.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A vertical mast positioning system comprising:
   a frame;
   a mast base;
   a movable mast collar;
   a universal joint;
   a first positioning mounting arm;
   a second positioning mounting arm;
   a first positioning actuator;
   a second positioning actuator;
   a first ball joint;
   a second ball joint;
   a first swivel joint;
   a second swivel joint;
   the mast base being pivotably connected to the frame via the universal joint;
   the mast base being pivotably movable with respect to the frame in all orientations;
   the mast base and the mast collar each being attached to a telescoping mast;
   the first positioning mounting arm and the second positioning mounting arm each extending upward from the frame;
   the first positioning actuator being extendably or retractably connected between the mast collar and the first positioning mounting arm;
   the second positioning actuator being extendably or retractably connected between the mast collar and the second positioning mounting arm;
   the first positioning actuator being connected to the mast collar via the first ball joint;
   the second positioning actuator being connected to the mast collar via the second ball joint;
   the first positioning actuator being connected to the first positioning mounting arm via the first swivel joint;
   the second positioning actuator being connected to the second positioning mounting arm via the second swivel joint; and
   wherein, in response to the mast base and the mast collar each being attached to the telescoping mast, the mast base being pivoted on the frame via the universal joint to a desired orientation and the mast collar being positioned, through the first positioning actuator and the second positioning actuator each being extended or retracted in a linear direction, so as to vertically orient the telescoping mast.

2. The vertical mast positioning system of claim 1 comprising: the mast base being fixedly attached to the telescoping mast.

3. The vertical mast positioning system of claim 1 comprising: the mast collar movably slides along an external periphery of the telescoping mast.

4. The vertical mast positioning system of claim 1 comprising:
   the universal joint being located in between the frame and the mast base.

5. The vertical mast positioning system of claim 1 comprising:
   a mast motor;
   the mast motor being disposed on the mast base; and
   the mast motor being configured to drive a telescoping motion of the telescoping mast.

6. The vertical mast positioning system of claim 1 comprising:
   a battery device;
   the battery device being disposed on the frame; and
   the first positioning actuator and the second positioning actuator each being powered by the battery device.

7. The vertical mast positioning system of claim 1 comprising:
   a mast motor;
   a battery device;
   the mast motor being disposed on the mast base;
   the battery device being disposed on the frame;
   the mast motor being configured to drive a telescoping motion of the telescoping mast;
   the mast motor, the first positioning actuator and the second positioning actuator each being powered by the battery device.

8. The vertical mast positioning system of claim 1 comprising:
   the first positioning actuator and the second positioning actuator each being an electrical screw drive actuator, a hydraulic ram actuator or a pneumatic piston actuator.

9. The vertical mast positioning system of claim 1 comprising:
   the first positioning actuator and the second positioning actuator being positioned perpendicular to each other.

10. The vertical mast positioning system of claim 1 comprising:
    the first positioning actuator being positioned in alignment with the first positioning mounting arm; and
    the second positioning actuator being positioned in alignment with the second positioning mounting arm.

11. The vertical mast positioning system of claim 1 comprising:
    a first stabilization plate; and
    the first stabilization plate being fastened in between the first positioning mounting arm and the second positioning mounting arm.

12. The vertical mast positioning system of claim 1 comprising:
    the mast base, the mast collar, the first positioning mounting arm, the second positioning mounting arm, the first positioning actuator and the second positioning actuator being configured to support a surveillance system with the telescoping mast and a camera mounted on the telescoping mast; and
    the frame being configured to be mounted on a mobile platform.

13. The vertical mast positioning system of claim 1 comprising:

the universal joint comprising a cross shaft, a frame hinge tab, a base hinge tab, a frame axle bolt, a frame bearing, a base axle bolt and a base bearing;
the frame hinge tab being attached to the frame;
the base hinge tab being attached to the mast base;
the cross shaft being located in between the frame hinge tab and the base hinge tab;
the frame axle bolt being inserted into the frame hinge tab and attached to the cross shaft;
the base axle bolt being inserted into the base hinge tab and attached to the cross shaft;
the frame bearing being disposed in between the frame axle bolt and the frame hinge tab; and
the base bearing being disposed in between the base axle bolt and the base hinge tab.

14. The vertical mast positioning system of claim 13 comprising:
the frame hinge tab and the base hinge tab being orthogonally aligned to each other; and
the frame axle bolt and the base axle bolt being orthogonally aligned to each other.

15. The vertical mast positioning system of claim 1 comprising:
a non-positioning mounting arm;
a non-positioning actuator;
the non-positioning mounting arm extending upward from the frame; and
the non-positioning actuator being connected in between the mast collar and the non-positioning mounting arm.

16. The vertical mast positioning system of claim 15 comprising:
the non-positioning actuator being positioned perpendicular to one of the first positioning actuator and the second positioning actuator; and
the non-positioning actuator being positioned opposite to the other of the first positioning actuator and the second positioning actuator.

17. The vertical mast positioning system of claim 15 comprising:
the non-positioning actuator being positioned in alignment with the non-positioning mounting arm.

18. The vertical mast positioning system of claim 15 comprising:
a second stabilization plate; and
the second stabilization plate being fastened in between the non-positioning mounting arm and one of the first positioning mounting arm and the second positioning mounting arm.

* * * * *